United States Patent
Preece

(10) Patent No.: US 11,858,055 B2
(45) Date of Patent: Jan. 2, 2024

(54) CUTTING ELECTRODE HEAD FOR A HANDHELD ELECTRICAL DISCHARGE MACHINING DEVICE

(71) Applicant: ROLLS-ROYCE plc, London (GB)

(72) Inventor: Christopher J. Preece, Derby (GB)

(73) Assignee: Rolls-Royce plc, London (GB)

( * ) Notice: Subject to any disclaimer, the term of this patent is extended or adjusted under 35 U.S.C. 154(b) by 602 days.

(21) Appl. No.: 17/021,460

(22) Filed: Sep. 15, 2020

(65) Prior Publication Data
US 2021/0107079 A1    Apr. 15, 2021

(30) Foreign Application Priority Data

Oct. 10, 2019  (GB) ..................................... 1914647

(51) Int. Cl.
  *B23H 7/30*  (2006.01)
  *B23H 1/08*  (2006.01)
  *B23H 1/10*  (2006.01)

(52) U.S. Cl.
  CPC ................ *B23H 7/30* (2013.01); *B23H 1/08* (2013.01); *B23H 1/10* (2013.01); *B23H 2400/00* (2013.01)

(58) Field of Classification Search
  None
  See application file for complete search history.

(56) References Cited

U.S. PATENT DOCUMENTS

| | | | | |
|---|---|---|---|---|
| 3,614,372 A | * | 10/1971 | Dulebohn | B23H 7/18 219/69.15 |
| 3,919,516 A | | 11/1975 | Ullmann et al. | |
| 4,134,807 A | * | 1/1979 | Briffod | B23H 7/28 205/661 |
| 5,324,907 A | * | 6/1994 | Wallace | B23H 7/30 219/69.15 |
| 5,543,599 A | | 8/1996 | Cole et al. | |
| 5,897,793 A | * | 4/1999 | Chavez | G21C 13/036 376/260 |
| 2010/0096365 A1 | * | 4/2010 | Gold | B23H 1/10 219/69.15 |

(Continued)

FOREIGN PATENT DOCUMENTS

| | | |
|---|---|---|
| EP | 3278916 | 2/2018 |
| FR | 2591922 A1 | 6/1987 |

(Continued)

OTHER PUBLICATIONS

Great Britain search report dated Mar. 24, 2020, issued in GB Patent Application No. 1914647.1.

(Continued)

*Primary Examiner* — Geoffrey S Evans
(74) *Attorney, Agent, or Firm* — Shumaker & Sieffert, P.A.

(57) ABSTRACT

A cutting electrode head for a handheld electrical discharge machining (EDM) device comprising: a housing; a cutting electrode supported in the housing, and configured to move from a retracted position to an extended position along an electrode axis (C) to cut a workpiece; and an actuator supported in the housing and movable along a movement axis (E) which is at an angle to the electrode axis (C), wherein movement of the actuator along the movement axis (E) causes the cutting electrode to move between its retracted and extended positions.

14 Claims, 5 Drawing Sheets

(56) References Cited

U.S. PATENT DOCUMENTS

2016/0361770 A1   12/2016   Rudgley

FOREIGN PATENT DOCUMENTS

JP           S5840226 A         3/1983
JP           11170119 A    *    6/1999

OTHER PUBLICATIONS

Extended Search Report from counterpart European Application No. 20188603.3 dated Feb. 23, 2021, 7 pp.
Response to Extended Search Report dated Feb. 23, 2021, from counterpart European Application No. 20188603.3 filed Oct. 12, 2021, 41 pp.

* cited by examiner

CUTTING ELECTRODE HEAD FOR A HANDHELD ELECTRICAL DISCHARGE MACHINING DEVICE

CROSS-REFERENCE TO RELATED APPLICATIONS

This specification is based upon and claims the benefit of priority from UK Patent Application No. GB 1914647.1, filed on 10 Oct. 2019, the entire contents which is hereby incorporated herein in its entirety.

BACKGROUND

Technical Field

The present disclosure relates to a cutting head for a handheld electrical discharge machining device, and a handheld electrical discharge machining device. The present disclosure also relates to a kit comprising a cutting head and an insert, a method of retrofitting a handheld electrical discharge machine, and a method of operating a handheld electrical discharge machining device.

Description of the Related Art

Handheld electrical discharge machining (EDM) devices are known in the art to comprise a cutting electrode head including a cutting electrode that extends along an electrode axis. In prior art devices the cutting electrode is moved between a retracted position and an extended position along the electrode axis, towards or away from a workpiece, by a movable actuator that moves in a direction parallel to the electrode axis. In some prior art devices, the actuator is arranged directly behind the electrode along the electrode axis, such that a movement axis of the actuator extends along the electrode axis.

A prior art cutting electrode head 10 is schematically shown in FIG. 1. The cutting electrode head 10 includes a movable actuator (bolt 12) that is attachable to a drive train of an EDM device. The bolt 12 is movable along a movement axis in the directions indicated by double-headed arrow B, i.e. left or right along the page in FIG. 1.

The bolt 12 comprises a flange 14 and a bolt head 16. An electrically insulating plastic sleeve 18 is disposed around the bolt head 16, and a seal 20 is disposed between the bolt head 16 and the plastic sleeve 18. A cutting electrode 22 extends from a base where it is attached to an end of the bolt head 16 to a tip 24 within the plastic sleeve 18. The cutting electrode 22 can be moved from a retracted position to an extended position along an electrode axis. It can be seen that the movement axis and the electrode axis are disposed along a common axis A.

In use, a high potential difference is applied between the cutting electrode 22, through the bolt 12, and a workpiece to be cut (not shown). The cutting electrode 22 is then moved along the axis A toward the workpiece until a distance between the tip 24 of the cutting electrode 22 and the workpiece is reduced to a critical distance. At the critical distance, an electrical spark is formed between the tip 24 of the cutting electrode 22 and the workpiece. The high temperature of the spark causes material to be liquidised at the point that spark contacts the workpiece.

During this process, a dielectric is supplied along a central aperture, through the bolt 12 and the cutting electrode 22 along the axis A, and discharged through a dielectric supply port in the tip 24 of the cutting electrode 22. The supplied dielectric is circulated within the plastic sleeve 18, and between the cutting electrode head 10 and the workpiece.

The dielectric has multiple functions. Firstly, it facilitates spark formation by increasing the electrical conductivity between the cutting electrode and the workpiece, as the dielectric has a lower electrical conductivity than air. Secondly, the dielectric acts to cool the liquefied material, so that it can be liberated from the surface of the workpiece. Finally, it flushes liberated material away from the point of cutting, so that further cutting can be performed.

However, effective circulation of dielectric between the cutting electrode head 10 and the workpiece can be difficult to achieve. For example, if a firm contact is not maintained between the plastic tube 18 and the workpiece, then dielectric will leak over the workpiece and/or surrounding areas. This is undesirable, as liquids such as dielectrics can damage sensitive components (e.g. electronics), and free liquid can inhibit the operation of complex systems (e.g. free liquid leaked within gas turbine engines).

Additionally, leakage of dielectric can cause air bubbles to form between the cutting electrode 22 and the workpiece. Air bubbles can prevent the formation of electrical sparks due to the low electrical conductivity of air, and many EDM devices are programmed to retract the cutting electrode head when this occurs. Repeated retraction and extension of the cutting electrode 22 can increase the total time taken to cut a piece of material using an EDM device.

Such prior art devices also have the drawback that the actuator increases the overall depth of the EDM device, i.e. the distance from a front of the device (the tip 24 of the electrode 22 in its extended position) to a rear of the device measured along the electrode axis. A large depth can render the EDM device unusable in applications where space around the workpiece is restricted. Several examples of such applications arise in the aerospace industry. For example, removing bolt heads from inside a gas turbine engine.

SUMMARY

According to a first aspect of the disclosure there is provided a cutting electrode head for a handheld electrical discharge machining (EDM) device comprising:
 a housing;
 a cutting electrode supported in the housing, and configured to move from a retracted position to an extended position along an electrode axis to cut a workpiece; and
 an actuator supported in the housing and movable along a movement axis which is at an angle to the electrode axis,
 wherein movement of the actuator along the movement axis causes the cutting electrode to move between its retracted and extended positions.

Optionally, the angle between the movement axis and the electrode axis is at least 45°. Optionally, the angle between the movement axis and the electrode axis is 90°.

Optionally, the actuator is configured to move the cutting electrode by way of a linear cam arrangement.

Optionally, the actuator may comprise a cam surface that is configured to contact a follower surface of the cutting electrode.

Optionally, the cam surface is profiled so that throughout a range of travel of the actuator corresponding to movement of the cutting electrode between the retracted and extended positions, a rate of change of displacement of the cutting electrode along the electrode axis with respect to displacement of the actuator along the movement axis is non-zero.

Optionally, the actuator comprises a profiled engagement portion defining a cam surface of the linear cam arrangement, and the profiled engagement portion is at least partially wedge shaped.

Optionally, the actuator is electrically connected to the cutting electrode through the contact surface of the cutting electrode.

Optionally, the cutting electrode is resiliently biased to its retracted position.

Optionally, the housing comprises a cutting surface configured to oppose a workpiece to be cut, wherein the cutting electrode is arranged to move within a recess in the cutting surface, wherein the cutting surface comprises a seal around an opening of the recess.

Optionally, the housing comprises a dielectric supply port in fluid communication with the recess and a dielectric return port in fluid communication with the recess.

Optionally, the dielectric supply port is in fluid communication with an interior of the actuator.

Optionally, the dielectric return port is in fluid communication with a sleeve surrounding the actuator.

According to a second aspect of the disclosure there is provided a kit comprising:
- a cutting electrode head according to the first aspect, wherein the cutting electrode is arranged to move within a recess in the cutting surface, wherein the cutting surface comprises a seal around an opening of the recess; and
- an insert that is insertable into the recess, wherein the insert is configured to cooperate with and fit within an inner surface of the recess.

Optionally, the insert has an aperture configured to cooperate with a head of a fastener.

According to a third aspect of the disclosure there is provided a handheld EDM device comprising a cutting electrode head according to the first aspect.

Optionally, a drive train of the handheld EDM device is connected to the actuator and configured to move the actuator along the movement axis.

According to a fourth aspect of the disclosure there is provided a method of retrofitting a handheld EDM device, the handheld EDM device comprising a drivetrain connected to an electrode cutting head, the method comprising the steps of:
- removing the electrode cutting head from the drivetrain; and
- attaching a cutting electrode head according to the first aspect to the drivetrain.

According to a fifth aspect of the disclosure there is provided a method of operating a handheld electrical discharge machining (EDM) device, the EDM device comprising:
- a housing;
- a cutting electrode supported in the housing, and configured to move from a retracted position to an extended position along an electrode axis; and
- an actuator supported in the housing and movable along a movement axis which is at an angle to the electrode axis,
- wherein movement of the actuator along the movement axis causes the cutting electrode to move between its retracted and extended positions, the method comprising the step of:
- moving the actuator from a first position to a second position along the movement axis to move the cutting electrode from its retracted position to its extended position.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
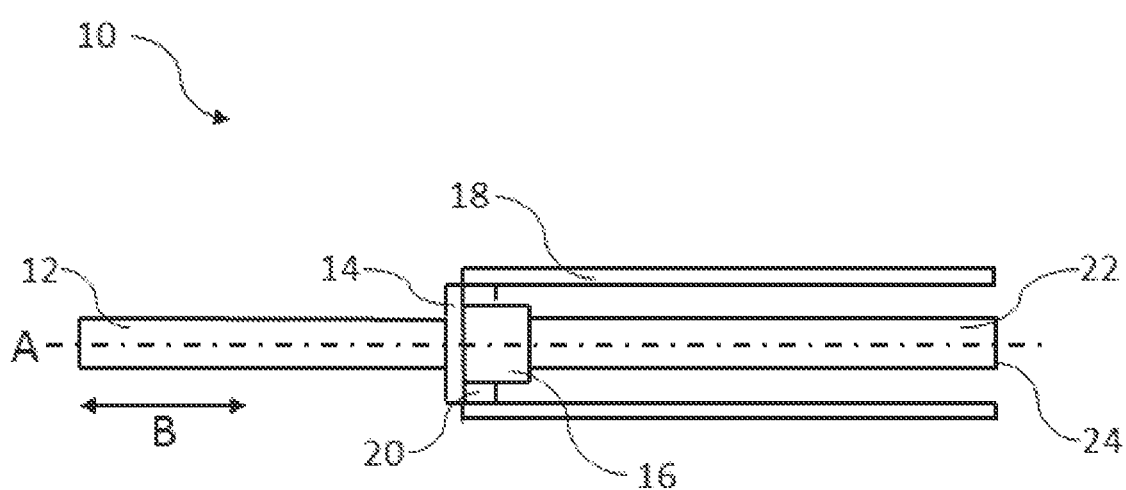
FIG. 1 shows a schematic view of a cutting electrode head according to the prior art.
Figure 2:
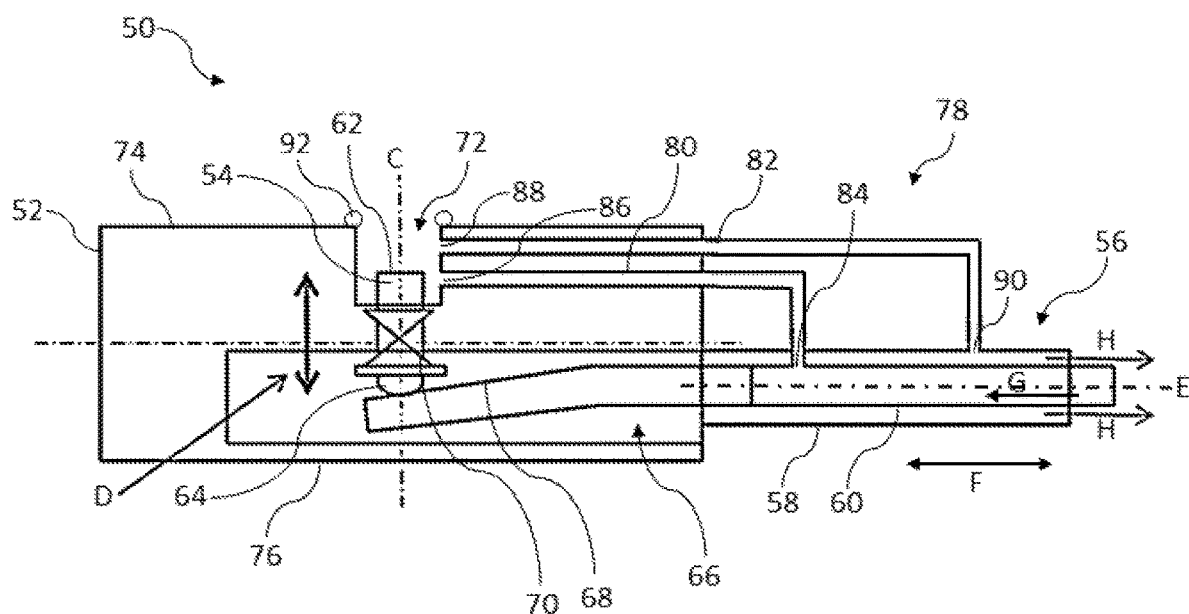
FIG. 2 schematically shows a cutting electrode head for an electrical discharge machining device according to an embodiment of the disclosure, with the cutting electrode in its retracted position.

FIG. 2 schematically shows a cutting electrode head 50 for an electrical discharge machining (EDM) device. The cutting electrode head 50 comprises a housing 52. The housing 52 comprises an cutting surface 74 arranged to oppose a workpiece in use. A recess 72 is formed in the cutting surface 74.

A cutting electrode 54 is supported in the housing 52 and arranged to move along an electrode axis C within the recess 72, in the directions indicated by double-headed arrow D, i.e. up or down the page in FIG. 2. The cutting electrode 54 is movable between a retracted position and an extended, cutting position. The cutting electrode 54 is shown in its retracted position in FIG. 2.

The cutting electrode 54 has a contact surface 64 at a proximal end for contacting an actuator, as will be described below, and a tip 62 at an opposing distal end.

The cutting electrode head 50 further comprises an actuator assembly 56. The actuator assembly 56 comprises a non-movable part, comprising an electrically insulating sleeve 58 attached to the housing 52. The sleeve 58 may comprise a plastics material, for example. The actuator assembly further comprises an electrically-conductive actuator. In this example the actuator comprises a hollow copper tube 60 supported within the non-movable part 58, and arranged to slide relative to the non-movable part (and hence, relative to the housing 52) along a movement axis E, in the directions indicated by double-headed arrow F, i.e. left or right along the page in FIG. 2.

In the example shown in FIG. 2, the movement axis E is disposed at 90° to the electrode axis C. However, in other examples different angles may be used, e.g. 80°, 75°, 60°, 45°, etc.

The actuator of the actuator assembly 56 further comprises a profiled engagement portion 66 attached to the hollow copper tube 60. In this example, the profiled engagement portion 66 comprises an electrically conductive material and is integrally formed with the hollow copper tube 60. However, in other examples, the profiled engagement portion 66 may be supported on an end of the tube. The profiled engagement portion 66 comprises a cam surface 68 that engages the contact surface 64 of the cutting electrode 54. The cam surface 68 is angled with respect to the movement axis E such that there is a linear cam arrangement defined between the cam surface 68 and the contact surface 64. In particular, the actuator 60 serves as a cam, and the cam surface 68 engages the contact surface 64 of the cutting electrode 54 which serves as a follower. The cam surface 68 comprises a plurality of engagement points that sequentially decrease in position along the electrode axis C away from the tip 62 of the cutting electrode 54. The plurality of engagement points are sequentially spaced along a length of the profiled engagement portion 66 in the movement axis E direction towards a distal end of the profiled engagement portion 66.

As the actuator (hollow copper tube 60 and profiled engagement portion 66) of the actuator assembly 56 is moved relative to the housing 52, the cam surface 68 causes the cutting electrode 54 to move in the directions indicated by double-headed arrow D along the electrode axis C.

In FIG. 2, the cutting electrode 54 is shown in an initial, retracted position. The cutting electrode 54 is resiliently biased into this retracted position by a spring 70 acting between the cutting electrode 54 and the housing or a component fixed to the housing. As the actuator of the actuator assembly 56 is moved relative to the housing 52, the cutting electrode 54 is urged against the resilient bias into an extended position for cutting.

Figure 3:
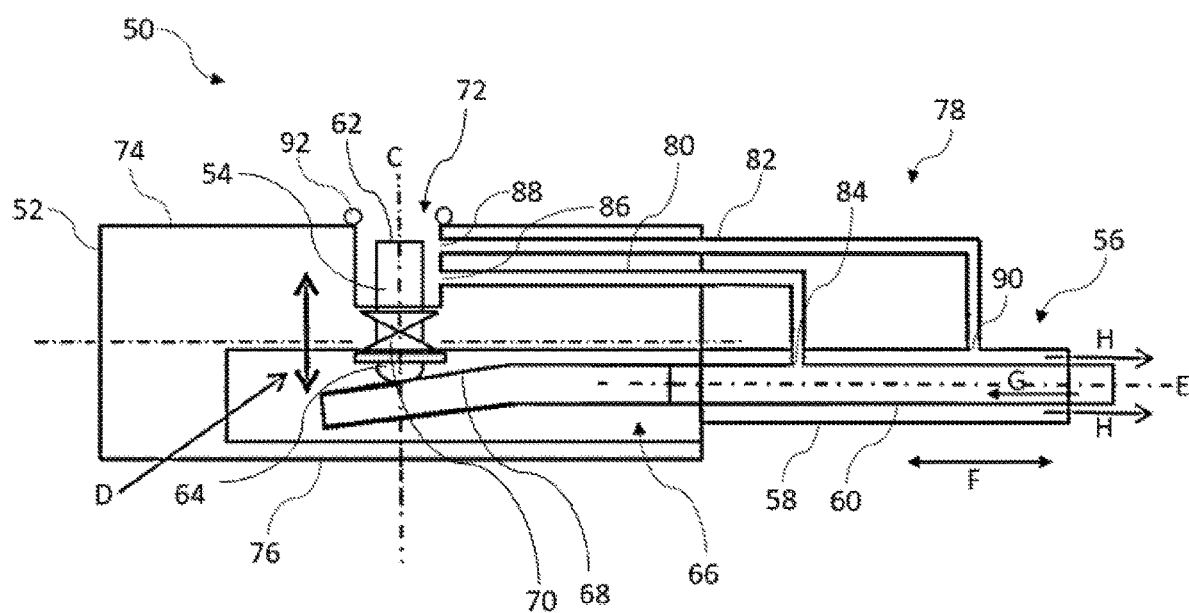
FIG. 3 schematically shows the cutting electrode head of FIG. 2, with the cutting electrode in its extended position.

FIG. 3 schematically shows the cutting electrode head 50 of FIG. 2, with the cutting electrode 54 in its extended position for cutting. In the extended position, the cutting electrode projects into the recess 72 formed in the cutting surface 74 of the housing 52. In this position, a potential difference is applied between the cutting electrode 54 and a workpiece pressed flush against the cutting surface 74 to cause an electrical spark to be formed between the tip 62 of the cutting electrode 54 and the workpiece when a dielectric is present between the tip 62 and the workpiece.

A rear surface 76 of the housing 52 is disposed opposite the cutting surface 74. A total depth of the cutting electrode head 50 can be measured between the cutting surface 74 and the rear surface 76 along the electrode axis C. The total depth of the cutting electrode head 50 can be made less than the total depth of cutting electrode heads in the prior art, because the actuator assembly 56 is arranged to extend along a movement axis E disposed at an angle to the electrode axis C. The total depth is minimised by arranging the actuator assembly to extend along a movement axis E that is perpendicular to the electrode axis C, as shown in FIGS. 2 and 3.

In the example shown in FIGS. 2 and 3, an electrical connection is formed between the cutting electrode 54 and the actuator at the interface between the contact surface 64 of the cutting electrode 54 and the engagement surface 68 of the profiled engagement portion 66. A further electrical connection is formed at the attachment point between the profiled engagement portion 66 and the hollow copper tube 60. Therefore, a potential difference can be applied between the tip 62 of the cutting electrode 54 and the workpiece by applying a voltage (e.g. via an EDM device) between the workpiece and the hollow copper tube 60.

In other examples, the profiled engagement portion 66 may be non-conducting, or may not be relied upon to form an electrical contact between the contact surface 64 and the hollow copper tube. In such examples, a separate wired connection may be provided between the cutting electrode 54 and either the profiled engagement portion 66 or the hollow copper tube 60.

In such examples, the cutting electrode 54 may comprise a non-conducting contact surface 64. For example, the cutting electrode 54 may comprise an electrode element electrically coupled via a wired connection as described above, and supported by a non-conductive carriage which defines the contact surface 64 for engaging the engagement surface 68.

The cutting electrode head 50 further includes a dielectric circuit 78 to circulate a dielectric through the cutting electrode head 50 in use. In the example shown in FIGS. 2 and 3 the dielectric circuit 78 is configured to circulate deionised water through the cutting head, but it will be apparent that other dielectrics could be used in other examples.

The dielectric circuit 78 comprises a dielectric feed tube 80 and a dielectric return tube 82. In use, dielectric is supplied within the hollow copper tube 60 as indicated by arrow G. The supplied dielectric enters the dielectric feed tube 80 through an interface 84. As the hollow copper tube 60 is moveable, the interface 84 is arranged to provide a sliding connection between the dielectric feed tube 80 and the hollow copper tube 60. In other examples, the interface 84 may be fixed, and the dielectric feed tube 80 may be flexible and/or extendable to accommodate movement of the hollow copper tube 60.

The supplied dielectric is discharged from the dielectric feed tube 80 at a dielectric supply port 86 in a side of the recess 72. The dielectric then performs its functions as part of the EDM cutting process. Used dielectric enters the dielectric return tube 82 through a dielectric return port 88 in a side of the recess 72. The used dielectric is discharged from the dielectric return tube 82 into the plastic tube 58 of the actuator assembly 56 through an interface 90. As the plastic tube 58 is a non-movable part of the actuator assembly 56, the interface 90 does not need to accommodate movement between the dielectric return tube 82 and the plastic tube 58. Used dielectric leaves the cutting electrode head 50 via the plastic tube 58 as indicated by arrows H.

In order to provide a firm and leak-free seal between the cutting surface 74 of the housing 52 and the workpiece, an O-ring seal 92 is provided on the cutting surface 74 around an opening of the recess 72. In other examples, a seal could be integrated into the cutting surface 74.

In contrast to prior art cutting electrode heads, the cutting electrode head 50 of the present disclosure may easily be positioned flush against the workpiece with cutting electrode 54 still in its retracted position. This has the advantage that a leak-free engagement can be established between the cutting surface 74 and the workpiece before dielectric is circulated through the dielectric circuit 78. This prevents the leakage of dielectric from the recess 72 into the surrounding environment, and so the cutting electrode head 50 may be used in applications that were previously unsuitable for EDM cutting using prior art EDM devices (e.g. in gas turbine engines, where there may be a strict requirement that no fluid be released into the surrounding environment).

Figure 4:
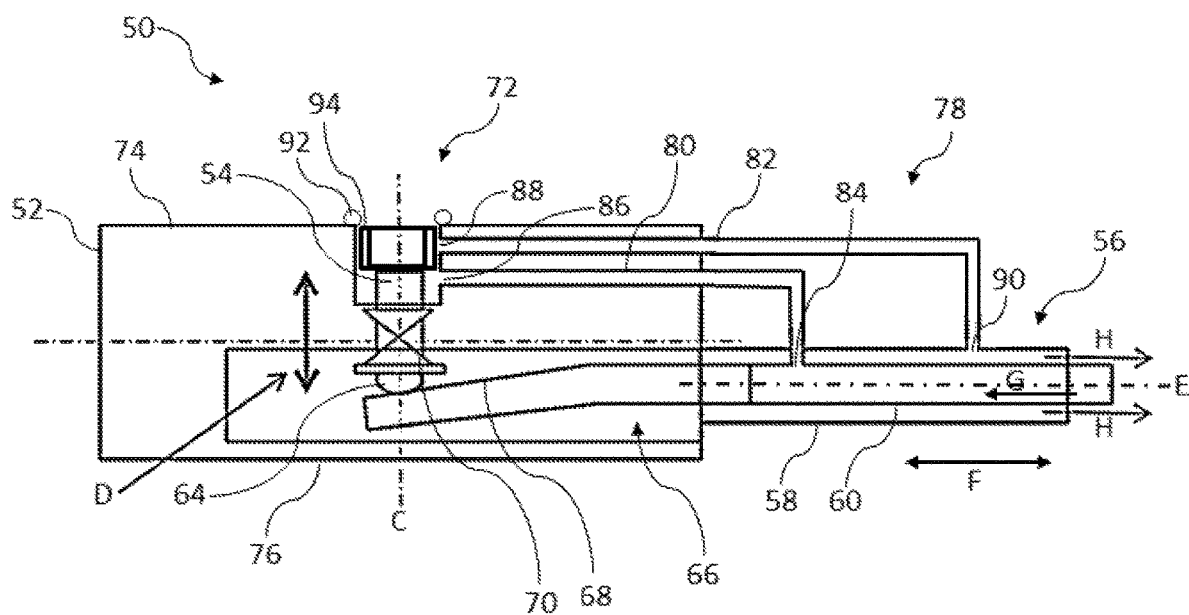
FIG. 4 schematically shows a kit according to an embodiment of the disclosure.

FIG. 4 schematically shows a kit according to an embodiment of the present disclosure. The kit comprises the cutting electrode head of FIG. 2 and an insert 94. Like reference numerals have been retained to indicate the same components.

In applications where the cutting electrode head 50 is to be used to remove an element such as a bolt head (e.g. from within a gas turbine engine), the insert 94 can be inserted into the recess 72 as shown. The insert 94 comprises a wall portion having an interior surface that defines an aperture through the insert 94 and an exterior surface that cooperates with and fits within an inner surface of the recess 72. The aperture may be shaped to match the shape of the element (such as a bolt head) to be cut. This reduces the amount of dielectric needed to perform an EDM cutting process, by effectively reducing the interior volume defined by the recess 72, and also beneficially provides a positive location of the bolt head to be cut within the cutting electrode head 50.

In the aerospace industry, a wide variety of fasteners are used that have various shapes and forms for the head of the fastener. Therefore, where the cutting electrode head 50 is to be used in aerospace applications, a kit of parts may be provided comprising the electrode cutting head 50 and a plurality of inserts, each of the inserts having an aperture shape that corresponds to the shape of a respective fastener head, e.g. circular, square, hex, double hex, etc. It will be apparent that similar inserts could be provided for use in any industry or for any set of fastener heads.

Figure 5A:
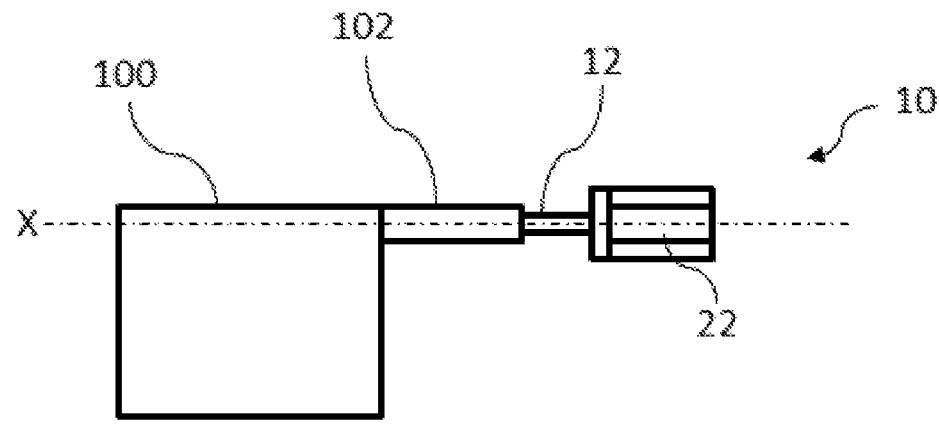
FIGS. 5a-c schematically show a method of retrofitting a handheld EDM device according to an embodiment of the disclosure.
Figure 5B:
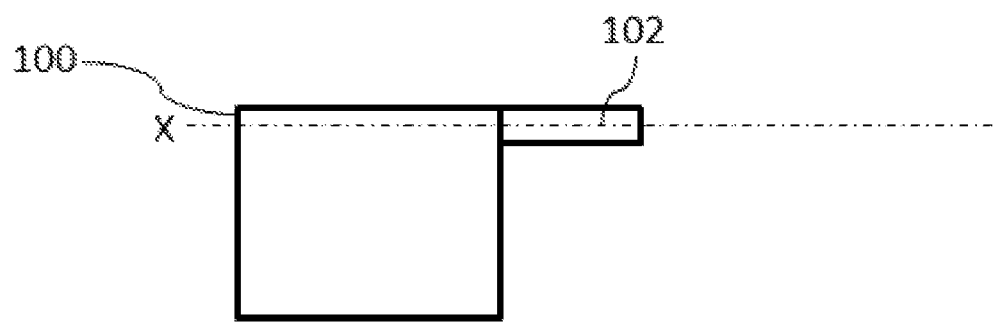
Figure 5C:
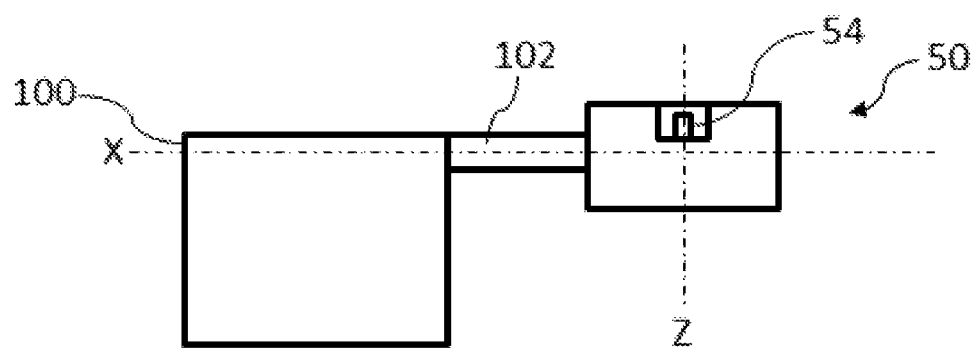

The cutting electrode head 50 of the present disclosure may be readily attached to a drive train of existing EDM devices by attaching the copper tube 60 to the EDM device drive train using a standard connector. FIGS. 5a-c schematically show the steps of a method of retrofitting a handheld EDM device in accordance with an embodiment of the disclosure. Like reference numerals from FIGS. 1 to 4 have been retained to indicate the same components.

FIG. 5a schematically shows a prior art EDM device 100 comprising a drive train 102. The drive train 102 is configured to move towards and away from the EDM device 100 along a movement axis X. A bolt 12 of the prior art cutting electrode head 10 described above with reference to FIG. 1 is attached to the drive train 102. In this arrangement, an electrode 22 of the prior art cutting head 10 is configured to extend along an electrode axis that is coaxial with the movement axis X.

In FIG. 5b, the bolt 12 has been removed from the drive train 102 to remove the prior art cutting electrode head 10 from the EDM device 100.

In FIG. 5c the hollow copper tube 60 of the cutting electrode head 50 has been attached to the drive train 102 using a standard connector. A cutting electrode 54 of the cutting electrode head 50 extends along an electrode axis Z when the drive train 102 extends towards or away from the EDM device 102.

This simple retrofit operation will effectively alter the 'cutting angle' (i.e. the angle of the electrode axis Z relative to the movement axis X) of the EDM device 100 from 0° to the movement axis X to 90° to the movement axis X, with no further modification to the EDM device 100 being necessary. Dielectric that was previously provided along the central aperture through the bolt 12 and cutting electrode 22 in the prior art cutting electrode head 10 will instead be provided to the interior of the hollow copper tube 60.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, while the disclosure has been described with reference to an dielectric, in some examples the dielectric could be substituted with an electrolyte fluid.

In the example shown in FIGS. 2 and 3, the profiled engagement portion 66 is partially wedge shaped, such that the engagement surface 68 comprises a plurality of engagement points that vary continuously and linearly in the electrode axis C direction as a function of an axial position on the profiled engagement portion 66 along the movement axis E. However, other shapes are also envisaged for the profiled engagement portion 66, e.g. concave/convex curved shapes, stepped shapes etc.

In the example shown in FIGS. 2 and 3, the profiled engagement portion 66 is formed of a solid piece of copper that is of circular cross-sectional shape at the point at which it attaches to the hollow copper tube 60, but presents a substantially planar engagement surface 68. However, any suitable material and cross-sectional shape may be used in practice. In some examples, the profiled engagement portion 66 may be hollow.

In the example shown in FIGS. 2 and 3, the cutting electrode 54 is moved from its retracted position to its extended position by movement of the movable part of the actuator assembly 56 into the cutting electrode head 50. However, by appropriate shaping of the profiled engagement portion 66, the cutting electrode 54 could alternatively be moved from its retracted position to its extended position by movement out the movable part of the actuator assembly 56 out of the cutting electrode head 50, e.g. using a reversed wedge shape.

What is claimed is:

1. A cutting electrode head for a handheld electrical discharge machining (EDM) device comprising:
   a housing;
   a cutting electrode supported in the housing, the cutting electrode configured to move from a retracted position to an extended position along an electrode axis (C) to cut a workpiece; and
   an actuator supported in the housing and movable along a movement axis (E) which is at an angle to the electrode axis (C), the actuator configured to move the cutting electrode by way of a linear cam arrangement,
   wherein movement of the actuator (60) along the movement axis (E) causes the cutting electrode to move between its retracted and extended positions, and
   wherein the cutting electrode is resiliently biased, by a spring acting between the cutting electrode and the housing or a component fixed to the housing, to its retracted position.

2. The cutting electrode head according to claim 1, wherein the angle between the movement axis (E) and the electrode axis (C) is at least 45°.

3. The cutting electrode head according to claim 1, wherein a cam surface of the linear cam arrangement is profiled so that throughout a range of travel of the actuator corresponding to movement of the cutting electrode between the retracted and extended positions, a rate of change of displacement of the cutting electrode along the electrode axis (C) with respect to displacement of the actuator along the movement axis (E) is non-zero.

4. The cutting electrode head according to claim 3, wherein the actuator comprises a profiled engagement portion defining a cam surface of the linear cam arrangement, and wherein the profiled engagement portion is at least partially wedge shaped.

5. The cutting electrode head according to claim 1, wherein the actuator is electrically connected to the cutting electrode through the contact surface of the cutting electrode.

6. The cutting electrode head according to claim 1, wherein the housing comprises a cutting surface configured to oppose a workpiece to be cut, wherein the cutting electrode is arranged to move within a recess in the cutting surface, wherein the cutting surface comprises a seal around an opening of the recess.

7. The cutting electrode head according to claim 6, wherein the housing comprises an electrolyte supply port in fluid communication with the recess and an electrolyte return port in fluid communication with the recess.

8. The cutting electrode head according to claim 7, wherein the electrolyte supply port is in fluid communication with an interior of the actuator.

9. A kit comprising:
a cutting electrode head according to claim 6; and
an insert that is insertable into the recess, wherein the insert is configured to cooperate with and fit within an inner surface of the recess.

10. The kit according to claim 9, wherein the insert has an aperture configured to cooperate with a head of a fastener.

11. A handheld EDM device comprising a cutting electrode head according to claim 1.

12. The handheld EDM device according to claim 11, wherein a drive train of the handheld EDM device is connected to the actuator and configured to move the actuator along the movement axis (E).

13. A method of retrofitting a handheld EDM device, the handheld EDM device comprising a drivetrain connected to an electrode cutting head, the method comprising the steps of:
removing the electrode cutting head from the drivetrain; and
attaching a cutting electrode head to the drivetrain, the cutting electrode head comprising:
a housing;
a cutting electrode supported in the housing, the cutting electrode configured to move from a retracted position to an extended position along an electrode axis (C) to cut a workpiece; and
an actuator supported in the housing and movable along a movement axis (E) which is at an angle to the electrode axis (C), the actuator configured to move the cutting electrode by way of a linear cam arrangement,
wherein movement of the actuator (60) along the movement axis (E) causes the cutting electrode to move between its retracted and extended positions, and
wherein the cutting electrode is resiliently biased, by a spring acting between the cutting electrode and the housing or a component fixed to the housing, to its retracted position.

14. A method of operating a handheld electrical discharge machining (EDM) device, the EDM device comprising:
a housing;
a cutting electrode supported in the housing, the cutting electrode configured to move from a retracted position to an extended position along an electrode axis (C), wherein the cutting electrode is resiliently biased, by a spring acting between the cutting electrode and the housing or a component fixed to the housing, to its retracted position; and
an actuator supported in the housing and movable along a movement axis (E) which is at an angle to the electrode axis (C), the actuator configured to move the cutting electrode by way of a linear cam arrangement,
wherein movement of the actuator along the movement axis (E) causes the cutting electrode to move between its retracted and extended positions,
the method comprising the step of:
moving the actuator from a first position to a second position along the movement axis (E) to move the cutting electrode from its retracted position to its extended position.

* * * * *